(12) United States Patent
Hart

(10) Patent No.: US 10,310,080 B2
(45) Date of Patent: Jun. 4, 2019

(54) THREE DIMENSIONAL MANUFACTURING POSITIONING SYSTEM

(71) Applicant: The Boeing Company, Chicago, IL (US)

(72) Inventor: Colin W. Hart, Everett, WA (US)

(73) Assignee: The Boeing Company, Chicago, IL (US)

( * ) Notice: Subject to any disclaimer, the term of this patent is extended or adjusted under 35 U.S.C. 154(b) by 400 days.

(21) Appl. No.: 14/631,584

(22) Filed: Feb. 25, 2015

(65) Prior Publication Data

US 2016/0245646 A1 Aug. 25, 2016

(51) Int. Cl.
| | |
|---|---|
| *B64F 5/60* | (2017.01) |
| *G01S 15/08* | (2006.01) |
| *G01S 17/88* | (2006.01) |
| *G01S 17/08* | (2006.01) |
| *G01S 13/87* | (2006.01) |
| *G01S 13/86* | (2006.01) |
| *G01S 13/75* | (2006.01) |
| *G01S 7/51* | (2006.01) |

(52) U.S. Cl.
CPC .............. *G01S 15/08* (2013.01); *B64F 5/60* (2017.01); *G01S 7/51* (2013.01); *G01S 13/75* (2013.01); *G01S 13/865* (2013.01); *G01S 13/876* (2013.01); *G01S 17/08* (2013.01); *G01S 17/88* (2013.01)

(58) Field of Classification Search
CPC .......... B64F 5/60; G01S 13/75; G01S 13/865; G01S 13/876; G01S 15/08; G01S 17/08; G01S 17/88; G01S 7/51

USPC .................................................. 702/152, 153
See application file for complete search history.

(56) References Cited

U.S. PATENT DOCUMENTS

| | | | |
|---|---|---|---|
| 2004/0135992 A1* | 7/2004 | Munro | G01S 17/10 356/4.01 |
| 2004/0169587 A1* | 9/2004 | Washington | G06K 7/10079 340/573.1 |
| 2007/0264968 A1* | 11/2007 | Frank | G06Q 30/02 455/404.2 |
| 2011/0205358 A1* | 8/2011 | Aota | G01S 19/23 348/143 |
| 2013/0010071 A1* | 1/2013 | Valik | G06F 3/017 348/46 |
| 2014/0019913 A1* | 1/2014 | Newman | G06F 3/0488 715/810 |
| 2014/0166740 A1* | 6/2014 | Everth | G06Q 10/20 235/375 |

(Continued)

OTHER PUBLICATIONS

Chien-Ho Ko, The Scientific World Journal vol. 2013 (2013), Article ID 217972, 8 pages, available at http://www.hindawi.com/journals/tswj/2013/217972.

*Primary Examiner* — Duy T Nguyen
(74) *Attorney, Agent, or Firm* — Felix L. Fischer

(57) ABSTRACT

An indoor positioning system employs a target sensor attached to a structure to form an anchor node. A coordinate system of the target sensor is aligned with a coordinate system of the structure. A handheld device is configured to transmit a signal to an object of interest and, based on a return signal from the object of interest and communication with the target sensor, generate a description of a location of the object of interest, the location description being provided in the coordinate system of the structure.

15 Claims, 5 Drawing Sheets

(56) References Cited

U.S. PATENT DOCUMENTS

2015/0186559 A1* 7/2015 Schmidt .............. G06F 17/5004
　　　　　　　　　　　　　　　　　　　　345/419
2015/0323324 A1* 11/2015 Katsman ................. G01S 19/34
　　　　　　　　　　　　　　　　　　　　701/490

* cited by examiner

THREE DIMENSIONAL MANUFACTURING POSITIONING SYSTEM

BACKGROUND INFORMATION

Field

Embodiments of the disclosure relate generally manufacturing process position location and more particularly to a combined system employing a position transmitter at a known location on an aircraft assembly and a handheld receiver device with orientation sensing to determine relative position from the transmitter and a laser designator and distance measuring system to establish location of a point designated by the laser with respect to a computer aided design (CAD) database.

Background

During manufacturing and assembly of complex systems such as aircraft, rotorcraft or other comparable structures the precise location of components and interfaces must often be determined. To facilitate fabricating an aircraft, as an example, the aircraft is defined by a 3D coordinate system, commonly referred to as an aircraft station coordinate system. The aircraft station coordinate system is based on an orthogonal three axis (XYZ) system wherein the X-axis of this system is positive pointing fore-aft and is typically called the station (STA) (alternately referred to as the fuselage station (FS) or workstation (WS)), the Z-axis is positive pointing upward and is known as the water line (WL), and the Y-axis is positive pointing along the plane's right wing. The Y-axis is usually called the butt line (BL).

To ensure that the completed aircraft meets all required fabrication and safety standards, numerous inspections are conducted during the fabrication process. In some instances, the inspection may reveal that a component is defective or installed at the wrong location. In this case, the inspector will fill out a form that includes the location of the component on the aircraft. As discussed above, locations within the aircraft are determined based on the aircraft station coordinate system. Therefore, the location of faulty parts, for example, will be given based on the aircraft station coordinate system as STA###, WL### and BL###. The aircraft station coordinate system as currently implemented provides only a rough location for the interior of the aircraft. More specifically, the aircraft station coordinate system does not provide sufficient location detail to enable a technician to quickly and accurately locate a part or component that has been determined to be faulty by a previous inspection or for identification of an installation location. For example, the X-Axis or STA axis may be laid out in ten foot graduations along the length of the aircraft, annotated with placards or similar visual cues placed every ten feet on the interior of the aircraft along the workstation axis. However, because of the complexity of modern aircraft, there may be numerous switches, valves, etc. all located within the general area described by the marked STA in the aircraft station coordinate system. Thus, it may be difficult for the technician to identify a specific part within the aircraft. WL and BL locations are generally intuitively known or measured out when needed. The existing solution for identifying a specific location within the structure requires physical measurement of the location of objects on the airplane by visually finding STA locations and determining WL and BL.

It is therefore desirable to provide an automated relative location sensing system for greater efficiency in finding locations of desired objects within a structure being assembled. It is further desirable to provide a quick way to determine the desired installation location of a part/LRU for machinists performing the assembly or recording results of an inspection.

SUMMARY

Exemplary embodiments provide an indoor positioning system which employs a target sensor attached to a structure to form an anchor node. A coordinate system of the target sensor is aligned with a coordinate system of the structure. A handheld device is configured to transmit a signal to an object of interest and, based on a return signal from the object of interest and communication with the target sensor, generate a description of a location of the object of interest, the location description being provided in the coordinate system of the structure.

The embodiments provide a method for determining the coordinates of an object of interest in a structure by positioning a target sensor at known coordinates on a structure. The beam of a distance measuring element is then directed from a handheld device onto a location in a structure for determining a distance. A relative position of the handheld device with respect to the target sensor is determined. A distance from the handheld device to the location is calculated as determined by the distance measuring element and the position of the location based on the relative position of the handheld device and distance of the location from the handheld device is then calculated.

The features, functions, and advantages that have been discussed can be achieved independently in various embodiments of the present disclosure or may be combined in yet other embodiments, further details of which can be seen with reference to the following description and drawings.

DETAILED DESCRIPTION

The system and methods described herein provide embodiments for an indoor positioning system (IPS) that enables determination of a precise location of a part on an aircraft. The precise location may then be provided to a recording system and/or to a second person to enable the second person to more easily locate the part. The system includes a sensor, referred to as a target sensor, that is mounted to a known location on the aircraft. The target sensor forms the anchor node of the IPS. More specifically, the target sensor is mounted such that X, Y, Z coordinates of the target sensor align with a known WL, BL, and the STA position on the aircraft. The system also includes a portable handheld device. The handheld device includes its own sensor capable of determining a relative location of the handheld within the aircraft based on information transmitted between the target sensor and the sensor located within the handheld device. The handheld device additionally includes orientation sensing capability. Thus, the handheld device knows its own location and orientation with respect to the WL, BL, and the STA lines.

In operation, the handheld device is configured to transmit a signal, such as a laser signal to a feature or part to be located. More specifically, if a user desires to identify an exact location of a specific part, the user merely points the handheld device at the part using an integral laser pointer to orient the handheld device at which time a laser distance measurement signal is transmitted to the part. The handheld device is adapted to receive the laser return signal from the part and use that laser return signal to calculate a distance between the handheld device and the part. Moreover, because the handheld device has a known relative position within the aircraft, based on information derived from the target sensor, the orientation and distance information may be combined with the positional information to generate a three-dimensional position of the part within the aircraft. Alternatively, the reverse process may be employed find the location of a part. A location using WL, BL and STA lines derived from drawings or a CAD database may be entered into handheld device using a key pad and directional indicia on a screen, such as display of current and desired location of the laser pointer, may then be employed to direct the orientation of the handheld to point the laser pointer to be positioned on the part.

Figure 1:
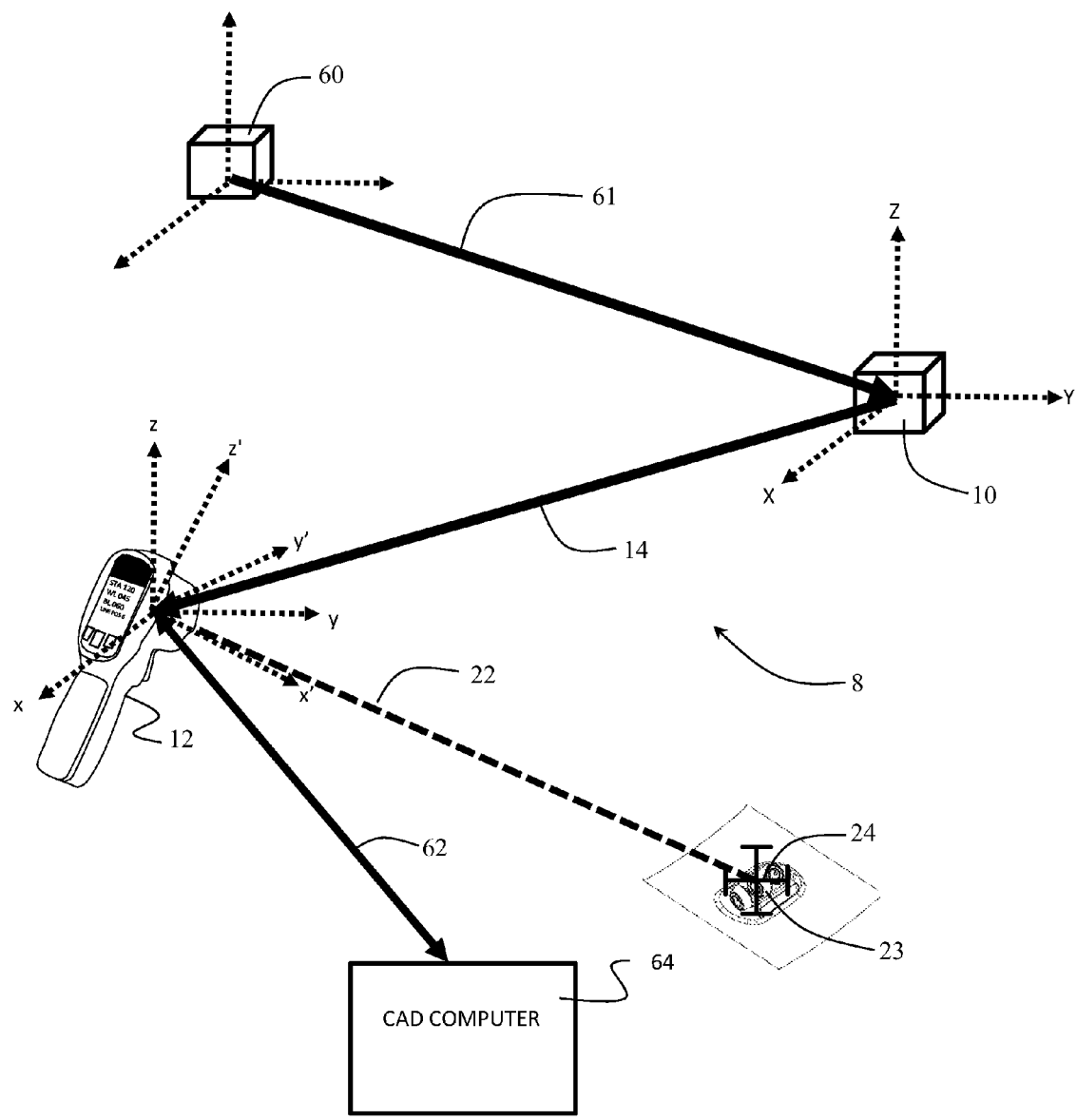
FIG. 1 is block diagram schematic representation of the interacting elements of an exemplary embodiment.
Figure 2:
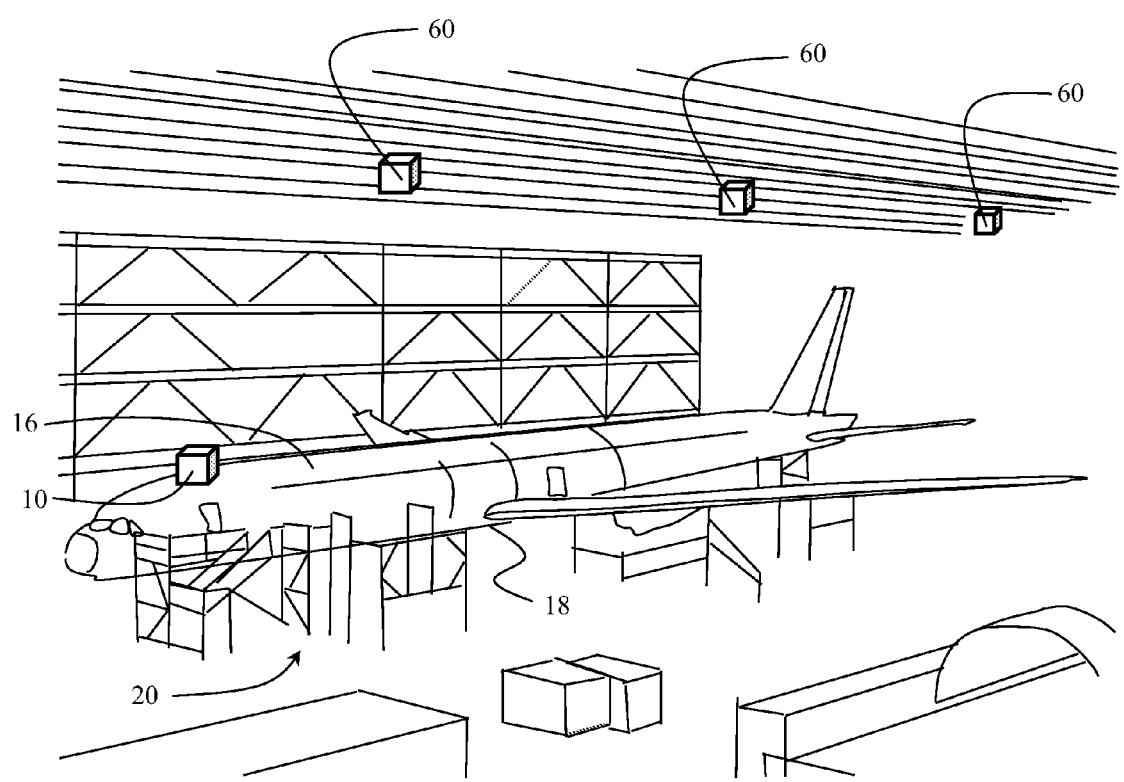
FIG. 2 is a pictorial view of an exemplary aircraft assembly line with an aircraft employing the embodiment for manufacturing and inspection processes on the line.

Referring to the drawings, FIG. 1 shows an indoor positioning system 8 that includes a target sensor 10 and a handheld device 12 adapted for wireless communication, represented by arrow 14. The target sensor 10 is mounted at a known position with an orthogonal reference, X, Y, Z aligned with the STA, WL and BL coordinate system of a structure in which the embodiment is being employed. In one exemplary use, the target sensor 10 is mounted to a known location on an interior of??? a fuselage 16 of an aircraft 18 being assembled on a production line 20 as shown in FIG. 2. Returning to FIG. 1, the handheld device 12 is adapted to define an offset orthogonal coordinate system x, y, z aligned with the XYZ reference of the target sensor. The handheld device 12 also includes an orientation sensor 40 which may be implemented as known in the art with a three axis accelerometer and a three axis gyroscope or similar commercially available configuration. The handheld device 12 may employ a laser pointer or similar device to produce a reference beam 22 with a visible indicator or spot that is pointed at an object of interest 23 at a location 24 such as a feature, part or component for which a definitive location identification is desired. A distance measurement from the handheld device 12 to the location 24 may be made using the same laser as the pointer or a secondary laser or ultrasonic system coaxial with reference beam 22, as described subsequently. The orientation sensor establishes a rotated orthogonal reference x', y', z' defined by the pointing action of the handheld device 12.

Figure 3:
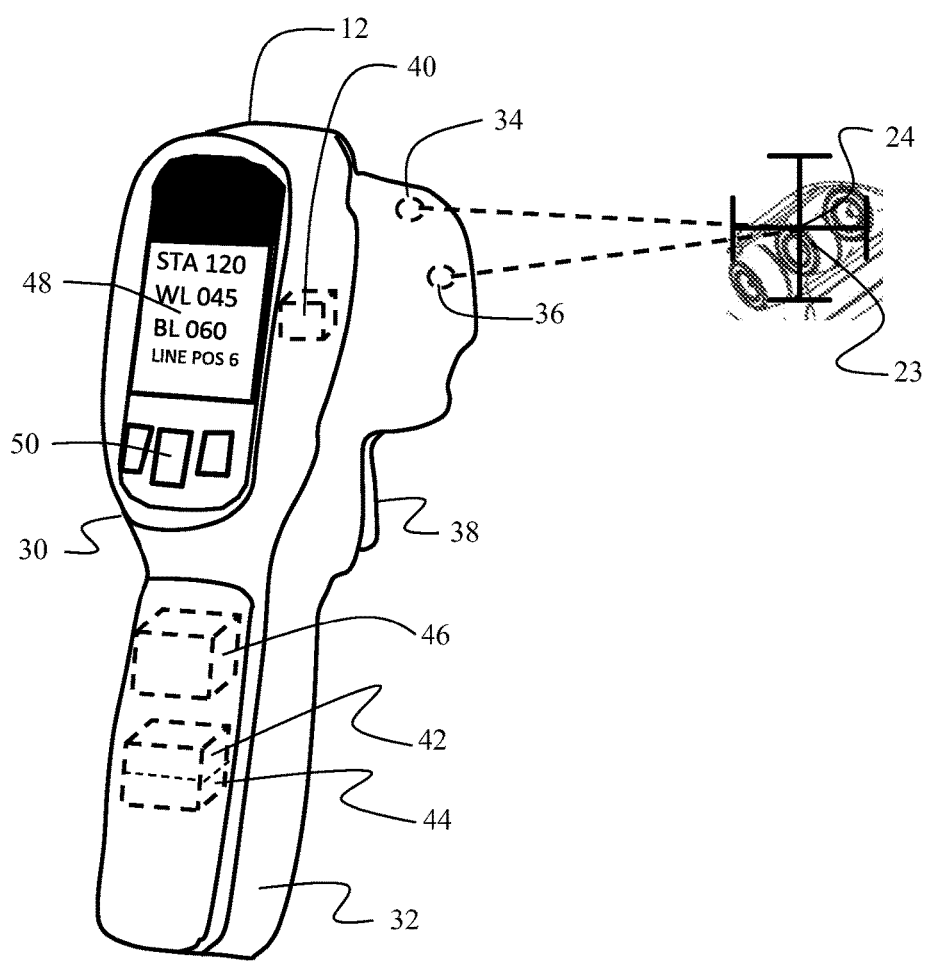
FIG. 3 is a detailed view of the handheld device employed in the embodiment.

Details of an exemplary handheld device 12 are shown in FIG. 3. A case 30 provides a handle 32 to manipulate the handheld device 12. A visual designator 34, which may be a laser pointer or similar device, provides a beam or spot which may be focused on the location 24 as previously described. A distance measuring element 36, which may be a second function of the laser in the laser pointer as one integral unit, or a secondary device such as an ultrasonic emitter/detector is coaxially targeted on the location 24. A trigger 38 or similar control may be employed to activate the distance measuring element 36 and may be a multi-position trigger to initially activate the laser pointer and then upon further contraction activate the distance measuring element. As previously described, an orientation sensor 40 is present which may also be activated by the trigger 36 to provide data on orientation to a microcontroller 42 with an associated memory 44. A portable sensor 46, typically a transmitter/receiver, is employed for communication with the target sensor 10 (seen in FIGS. 1 and 2). A display 48 may be provided to display results of the position of location 24 with a description such as STA, WL and BL coordinates upon calculation by the system, as will be described subsequently. Additional controls such as keypad 50 may be provided to command storage of data in the microcontroller memory 44, scrolling of prior data points or other functions.

Returning to FIGS. 1 and 2, one or more additional position elements 60 may be provided, for example at fixed locations within the assembly line 20 to provide one or more fixed references external to the structure, for example to provide relative position of the target sensor 12 on the aircraft within the assembly line or to provide an actual physical location of the object of interest. The positional elements 60 may have comparable functionality as the target sensor 12. Wireless communication from the additional position elements, represented by arrow 61, may be received by the first position element and/or hand held device, directly or indirectly. Additionally, the handheld device 12 may communicate wirelessly, as represented by arrow 62 with a server or computer 64 providing CAD data for additional information relevant to the identified location 24, which may then be displayed, or for remote storage or reporting of the location 24, as an example, for inspection records.

Figure 4:
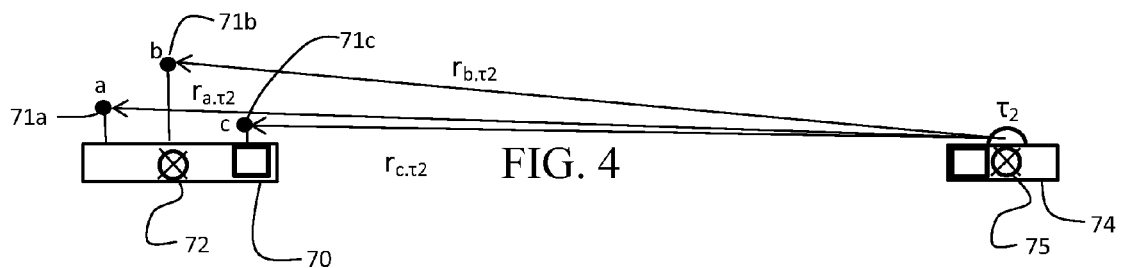
FIG. 4 is a schematic diagram for relative position calculation between elements of the embodiment.

Position determination between the target sensor 12, the additional position elements 60 and the handheld device 12 may be accomplished as shown in FIG. 4. A first one of the components 70 provides three points 71a, 71b and 71c offset from an origin 72 of an orthogonal coordinate set defining distances a, b and c respectively from the origin. A second one of the components 74 provides relative position 75, defined as $\tau_2$. The points 71a, 71b and 71c may comprise transmitters or receivers electronically coupled to a corresponding receiver or transmitter at the offset origin 75. The transmitters and receivers employed in the target sensor 12 and additional positional elements 60 may be such devices a RFID tags and RFID receivers with distance sensing. Spacing of the RFID tags at a, b and c is determined for sufficient angular resolution for the calculations described subsequently.

A vector providing angle and distance information between the origin 72 and the relative position 75, $\tau_2$, of the second component. The points 71a, 71b and 71c have radii $r_{a,\tau2}$, $r_{b,\tau2}$ and $r_{c,\tau2}$ respectively from $\tau_2$, defined as vector $\overrightarrow{P_{r,\tau2}}$, and geometrically, $$(r_{a,\tau2})^2 = (x-a_x)^2 + (y-a_y)^2 + (z-a_z)^2 \qquad \text{eqn \#1}$$

$$(r_{b,\tau2})^2 = (x-b_x)^2 + (y-b_y)^2 + (z-b_z)^2 \qquad \text{eqn \#2}$$

$$(r_{c,\tau2})^2 = (x-c_x)^2 + (y-c_y)^2 + (z-c_z)^2 \qquad \text{eqn \#3}$$

where $[a_x\ a_y\ a_z]$ $[b_x\ b_y\ b_z]$ and $[c_x\ c_y\ c_z]$ are vectors for the locations of the points 71a, 71b and 71c from the origin 72 and x, y and z are the coordinates of relative position 75 of the second component from the origin 72. Letting $(x,y,z) = \overrightarrow{P_{abc}}$ then $$\overrightarrow{P_{\tau2}} = \overrightarrow{P_{abc}} + \overrightarrow{P_{r,\tau2}} \qquad \text{eqn\#4}$$

providing the position of the second component 74 relative to the known origin of the first component 70. These equations may be employed for calculation of relative position between the target sensor 10 and handheld device 12, and/or the target sensor and additional position element 60. The microcontroller 42 in the handheld device 12 may be employed to perform the calculations described for relative position between the target sensor 10 and handheld device 12, with an RFID sensor as the portable sensor 46 and with spaced RFID tags in the target sensor defining points 71$a$, 71$b$ and 71$c$.

Calculation of the position of location 24 relative to the handheld device 12 is accomplished using the distance measuring element 36. Presuming that the reference beam 22 of the distance measuring element is coaxial with an x' axis of the handheld device as shown in FIG. 1, the position vector of the location 24 relative to the handheld device 12 will be [x' y' z']=[d 0 0] where d is the distance measured by the distance measuring element. For example, if the distance measuring element is a laser, d=c($t_2$−$t_0$) where c is the speed of light and $t_0$ is the emission time of the beam and $t_2$ is the time of receipt of the reflected beam from location 24 and may be calculated by the microcontroller in the handheld device.

Figure 5:
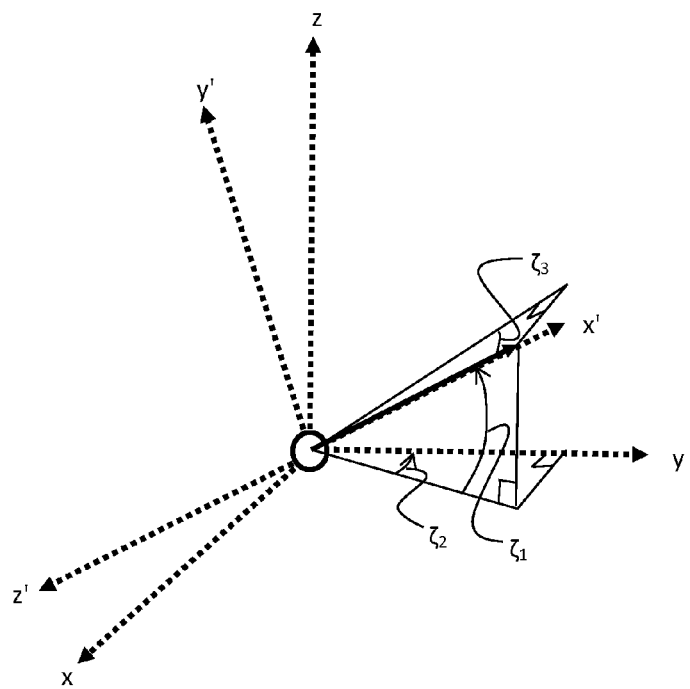
FIG. 5 is a diagram showing orientation calculation for the handheld unit in the embodiment; and, FIG. 6 is a flow chart of a method for location detection employing the embodiment.

The orientation sensor 40 is employed to calculate the relative position of location 24 with conversion of the rotated coordinates x', y' and z' of the handheld device to the offset coordinates x, y, z parallel to the coordinates of the target sensor as previously described as shown in FIG. 5. Conversion of the coordinates of location 24 defined as $\overline{L_s}$ is $$\overline{L_s}=[x\ y\ z]=[d\ \cos(\zeta_1)\cos(\zeta_2)\ d\ \cos(\zeta_1)\sin(\zeta_2)\ d\ \cos(\zeta_3)\sin(\zeta_1)] \qquad \text{eqn\#5}$$

Position of the location 24, $\overline{P_f}$, is then calculated as $$\overline{P_f}=\overline{P_{abc}}+\overline{P_{r,\tau 2}}+\overline{L_s}$$

where $\overline{P_{abc}}$ is the location of the target sensor 10 as the first component as previously described, $\overline{P_{r,\tau 2}}$ is the calculated location of the handheld device 12 as the second component, and $\overline{L_s}$ is the relative position of location 24 from the handheld device.

The position relative of the location 24 to an additional position element 60 may be similarly calculated as $$\overline{P_f}=\overline{P_{TS}}+\overline{P_{HH}}+\overline{L_s}$$

where $\overline{P_{TS}}$ is the calculated relative position between the additional position element 60 as the first component 70 and the target sensor 12 as the second component 74, as previously described and $\overline{P_{HH}}$ is the calculated relative position between the target sensor 10 as the first component 70 and the handheld device 12 as the second component 74 as previously described. This allows defining an actual physical location of the object of interest on the assembly line based on the position relative to the fixed additional position element.

While described herein with relation to offset orthogonal reference systems, the relative positions of the elements in the system may be determined in spherical coordinates using comparable distance and angle measurement techniques and then converted to an orthogonal coordinate representation in STA, WL and BL coordinates by the microcontroller.

Figure 6:
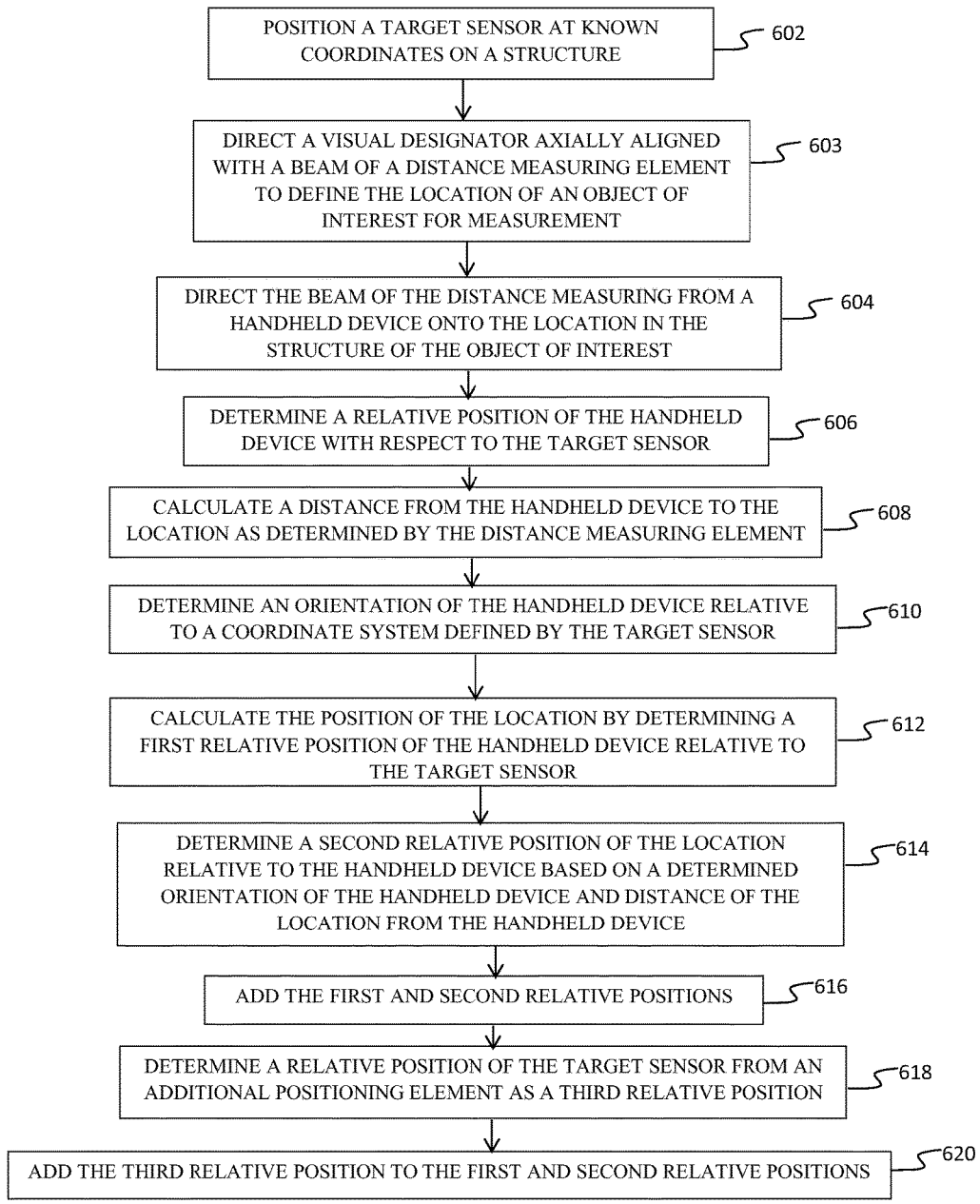

The embodiments disclosed provide a method for determining the location of an object of interest within the structure based on either the target sensor providing coordinates in the aircraft coordinate system or a fixed alternate sensor on the assembly line for actual physical location as shown in FIG. 6. A target sensor is positioned at known coordinates on a structure, step 602. A visual designator axially aligned with a beam of a distance measuring element is directed to define the location of an object of interest for measurement, step 603. The beam of the distance measuring element is then directed from a handheld device onto the location in the structure of the object of interest, step 604. A relative position of the handheld device with respect to the target sensor is determined, step 606 and a distance from the handheld device to the location is calculated as determined by the distance measuring element, step 608. An orientation of the handheld device relative to a coordinate system defined by the target sensor is determined, step 610. The position of the location may then be calculated by determining a first relative position of the handheld device relative to the target sensor, step 612 and determining a second relative position of the location relative to the handheld device based on a determined orientation of the handheld device and distance of the location from the handheld device, step 614, and adding the first and second relative positions, step 616. A relative position of the target sensor from an additional positioning element may be accomplished as a third relative position, step 618. The third relative position may then be added to the first and second relative positions to determine a position of the location relative to the additional positioning element, step 620, to provide, as an example, an actual physical location of the object of interest on the assembly line.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. An indoor positioning system comprising:
    a target sensor attached to a structure, said structure movable on an assembly line, said target sensor having a plurality of transmitters positioned offset from an origin to define an orthogonal coordinate system of the target sensor, said orthogonal coordinate system of the target sensor being aligned with a station, water line and butt line (STA, WL and BL) coordinate system of the structure as defined in computer aided design (CAD) data for the structure; and
    a handheld device adapted to communicate wirelessly with a computer providing the CAD data and having
        a distance measuring element to transmit a signal to an object of interest and to receive a return signal from the object of interest,
        a portable sensor with a receiver adapted for communication between the handheld device and the plurality of transmitters in the target sensor,
        an orientation sensor adapted to establish an offset orthogonal coordinate system with coordinates x, y, z parallel to the orthogonal coordinate system of the target sensor and a rotated orthogonal reference with coordinates x', y' and z' defined by a pointing action of the handheld device, and,
        a microcontroller,
    said microcontroller connected to the portable sensor and orientation sensor and adapted to calculate vectors for a relative distance and orientation between the rotated orthogonal reference of the handheld device, and the origin of the orthogonal coordinate system of the target sensor based on the offset of the plurality of transmitters from the origin, said vector calculations comprising a vector $\vec{P_{\tau 2}} = \vec{P_{abc}} + \vec{P_{r,\tau 2}}$ wherein $\vec{P_{r,\tau 2}}$, is defined geometrically as $(r_{a,\tau 2})^2 = (x-a_x)^2 + (y-a_y)^2 + (z-a_z)^2$; $(r_{b,\tau 2})^2 = (x-b_x)^2 + (y-b_y)^2 + (z-b_z)^2$; $(r_{c,\tau 2})^2 = (x-c_x)^2 + (y-c_y)^2 + (z-c_z)^2$, and $[a_x\, a_y\, a_z]$ $[b_x\, b_y\, b_z]$ and $[c_x\, c_y\, c_z]$ are vectors for the locations of the transmitters offset from the origin, and $\tau_2$ is the position of the offset orthogonal coordinate system, said microcontroller further adapted to calculate a distance between the handheld device and object of interest based on the transmitted and received return signals wherein a position vector of the object of interest relative to the handheld device is $[x', y', z'] = [d, 0, 0]$ and d is a distance measured by the distance measuring element, and conversion of the coordinates of the object of interest is defined as $\vec{L_s} = [x, y, z] = [d\cos(\zeta_1)\cos(\zeta_2), d\cos(\zeta_1)\sin(\zeta_2), d\cos(\zeta_3)\sin(\zeta_1)]$ wherein $\zeta_1$ is an angle between x and x', $\zeta_2$ is an angle between y and y' and $\zeta_3$ is an angle between z and z' thereby providing a vector position of the object of interest as $\vec{P_f} = \vec{P_{abc}} + \vec{P_{r,\tau 2}} + \vec{L_s}$, and the micro controller further adapted to display a description of a location of the object of interest in the coordinate system of the structure relative to the CAD data.

2. The indoor positioning system of claim 1, wherein the target sensor incorporates RFID tags as the plurality of transmitters and the portable sensor comprises an RFID receiver.

3. The indoor positioning system of claim 1, wherein the structure is an aircraft, and the coordinate system of the structure is an aircraft station coordinate system.

4. The indoor positioning system as defined in claim 3 further comprising a display on the handheld device to display the description of the location in the aircraft station coordinate system.

5. The indoor positioning system of claim 1, wherein the distance measuring element is configured to transmit a laser signal and the microcontroller is adapted to determine a distance from the handheld device and the object of interest based on a return laser signal received by the distance measuring element.

6. The indoor positioning system of claim 1 wherein the distance measuring element is selected from the set of a laser distance measurement device and an ultrasonic distance measurement device.

7. The indoor positioning system of claim 1 further comprising a visual designator having a coaxial beam with the distance measuring element.

8. The indoor positioning system of claim 7 wherein the visual designator is a laser pointer.

9. The indoor positioning system as defined in claim 1 further comprising an additional position element configured to communicate with the target sensor to define a fixed reference position external to the structure.

10. A method for determining the coordinates of an object of interest in a structure comprising:
positioning a target sensor having a plurality of transmitters positioned to define an orthogonal coordinate system of the target sensor aligned with known station, water line and butt line (STA, WL and BL) coordinates on the structure as defined in computer aided design (CAD) data for the structure;
communicating wirelessly between a handheld device and a computer providing the CAD data;
directing a beam of a distance measuring element from the handheld device onto a location in the structure to transmit a signal to a location and to receive a return signal from the location to measure a distance;
communicating between the handheld device and the plurality of transmitters with a portable sensor having a receiver adapted to communicate with the plurality of transmitters to determine a vector position of the handheld device in the coordinate system with respect to the target sensor;
calculating with a microcontroller connected to the portable sensor and adapted calculate a distance based on the transmitted signal and received return signal, a distance from the handheld device to the location as determined by the distance measuring element; and,
calculating with the microcontroller connected to the portable sensor and adapted to calculate a vector based on the coordinate system for a relative distance and orientation between the handheld device and the target sensor wherein a rotated orthogonal reference of the handheld device, and an origin of the orthogonal coordinate system of the target sensor based on an offset of the plurality of transmitters from the origin, said vector calculations comprising a vector $\vec{P_{\tau 2}} = \vec{P_{abc}} + \vec{P_{r,\tau 2}}$ wherein $\vec{P_{r,\tau 2}}$, is defined geometrically as $(r_{a,\tau 2})^2 = (x-a_x)^2 + (y-a_y)^2 + (z-a_z)^2$; $(r_{b,\tau 2})^2 = (x-b_x)^2 + (y-b_y)^2 + (z-b_z)^2$; $(r_{c,\tau 2})^2 = (x-c_x)^2 + (y-c_y)^2 + (z-c_z)^2$, and $[a_x\, a_y\, a_z]$ $[b_x\, b_y\, b_z]$ and $[c_x\, c_y\, c_z]$ are vectors for the locations of the transmitters offset from the origin, and $\tau_2$ is the position of the offset orthogonal coordinate system, and to calculate a second vector for position of the location based on the vector position of the handheld device with respect to the target sensor and distance of the location from the handheld device wherein $[x', y', z'] = [d, 0, 0]$ and d is the distance measured by the distance measuring element, and conversion of the coordinates of the object of interest is defined as $\vec{L_s} = [x, y, z] = [d\cos(\zeta_1)\cos(\zeta_2), d\cos(\zeta_1)\sin(\zeta_2), d\cos(\zeta_3)\sin(\zeta_1)]$ wherein $\zeta_1$ is an angle between x and x', $\zeta_2$ is an angle between y and y' and $\zeta_3$ is an angle between z and z', said second vector comprising $\vec{P_f} = \vec{P_{\tau 2}} + \vec{L_s}$ to define an actual physical location of the object of interest on the structure with respect to the CAD data.

11. The method as defined in claim 10 wherein the handheld device includes an orientation sensor and further comprising determining an orientation of the handheld device with the orientation sensor and calculating with the microprocessor a rotated orthogonal reference relative to the coordinate system defined by the plurality of transmitters in the target sensor.

12. The method as defined in claim 10 further comprising directing a visual designator axially aligned with the beam of the distance measuring element to define the location for measurement.

13. A method for determining the coordinates of an object of interest in a structure comprising:
positioning a target sensor having a plurality of transmitters positioned to define an orthogonal coordinate system of the target sensor aligned with known station, water line and butt line (STA, WL and BL) coordinates on the structure;
directing a beam of a distance measuring element from a handheld device including an orientation sensor to transmit a signal to a location and to receive a return signal from the location in the structure for determining a distance;

communicating between a portable sensor in the handheld device with a receiver adapted for communication between the handheld device and the plurality of transmitter/receivers to determine with a microcontroller connected to the portable sensor and orientation sensor a vector position of the handheld device with respect to the target sensor based on the coordinate system;

using the microcontroller adapted to calculate vectors for a relative distance and orientation between the handheld device and the target sensor, determining a first relative position of the handheld device relative to the target sensor based on the vector position of the handheld device with respect to the target sensor comprising a vector $\vec{P_{\tau2}} = \vec{P_{abc}} + \vec{P_{r,\tau2}}$ wherein $\vec{P_{r,\tau2}}$, is defined geometrically as $(r_{a,\tau2})^2=(x-a_x)+(y-a_y)^2+(Z-a_z)^2$; $(r_{b,\tau2})^2=(x-b_x)^2+(y-b_y)^2+(z-b_z)^2$; $(r_{c,\tau2})^2=(x-c_x)^2+(y-c_y)^2+(z-c_z)^2$, and $[a_x\ a_y\ a_z]$ $[b_x\ b_y\ b_z]$ and $[c_x\ c_y\ c_z]$ are vectors for locations of the transmitters offset from an origin of the orthogonal coordinate system, and $\tau_2$ is the position of an offset orthogonal coordinate system of the handheld device;

using the microcontroller, determining a second vector for relative position of the location relative to the handheld device based on a determined orientation of the handheld device using the orientation sensor by calculating a rotated orthogonal reference $[x', y', z']$ relative to the orthogonal coordinate system defined by the plurality of transmitters in the target sensor said second vector comprising as $\vec{L_s}=[x, y, z]=[d\cos(\zeta_1)\cos(\zeta_2), d\cos(\zeta_1)\sin(\zeta_2), d\cos(\zeta_3)\sin(\zeta_1)]$ wherein $[x', y', z']=[d, 0, 0]$ and d is a distance from the handheld device to the location measured by the distance measuring element and $\zeta_1$ is an angle between x and x', $\zeta_2$ is an angle between y and y' and $\zeta_3$ is an angle between z and z'; and, adding the first and second relative positions in the microcontroller to define an actual physical location of the object of interest on the structure as $\vec{P_f} = \vec{P_{\tau2}} + \vec{L_s}$.

14. The method as defined in claim 13 further comprising determining with the microcontroller a relative position of the target sensor from an additional positioning element as a third relative position.

15. The method as defined in claim 14 further comprising adding the third relative position to the first and second relative positions in the microcontroller to determine a position of the location relative to the additional positioning element to define an actual physical location of the object of interest on an assembly line based on the position of the location relative to the additional position element.

\* \* \* \* \*